(12) United States Patent
Joung et al.

(10) Patent No.: US 12,404,378 B2
(45) Date of Patent: Sep. 2, 2025

(54) POLYOLEFIN FILM AND PROCESS FOR PREPARING THE SAME

(71) Applicant: HANWHA SOLUTIONS CORPORATION, Seoul (KR)

(72) Inventors: Ui Gap Joung, Daejeon (KR); Sung Dong Kim, Daejeon (KR); Hye Ran Park, Daejeon (KR); Junho Seo, Daejeon (KR); Munhee Lee, Daejeon (KR); Seongjae Lim, Daejeon (KR); Yujeong Jeong, Daejeon (KR); Tae Uk Jeong, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 678 days.

(21) Appl. No.: 17/779,211

(22) PCT Filed: Nov. 20, 2020

(86) PCT No.: PCT/KR2020/016424
§ 371 (c)(1),
(2) Date: May 24, 2022

(87) PCT Pub. No.: WO2021/107508
PCT Pub. Date: Jun. 3, 2021

(65) Prior Publication Data
US 2023/0002573 A1 Jan. 5, 2023

(30) Foreign Application Priority Data
Nov. 28, 2019 (KR) .......... 10-2019-0155703

(51) Int. Cl.
*C08J 5/18* (2006.01)
*C08F 4/6592* (2006.01)
*C08F 10/02* (2006.01)

(52) U.S. Cl.
CPC ............. *C08J 5/18* (2013.01); *C08F 4/6592* (2013.01); *C08F 10/02* (2013.01); *C08J 2323/06* (2013.01)

(58) Field of Classification Search
CPC .. C08F 210/16; C08F 210/14; C08F 2500/12; C08F 2500/06; C08F 2500/26; C08F 2500/35; C08F 4/65925
See application file for complete search history.

(56) References Cited

U.S. PATENT DOCUMENTS

2004/0152591 A1    8/2004  Jin
2013/0253150 A1*   9/2013  Lu .................... C08F 4/6055
                                                        526/90

(Continued)

FOREIGN PATENT DOCUMENTS

AU    2018255900 A1    10/2019
CN    104918972 A       9/2015

(Continued)

OTHER PUBLICATIONS

An office action issued on Jun. 20, 2023, for corresponding JP Patent Application.

(Continued)

*Primary Examiner* — Eli D. Strah
(74) *Attorney, Agent, or Firm* — Harvest IP Law, LLP

(57) ABSTRACT

The present invention relates to a polyolefin film and to a process for preparing the same. The polyolefin film, specifically, the linear low-density polyethylene film according to an embodiment of the present invention is readily formed and has excellent mechanical strength and excellent heat seal characteristics.

16 Claims, 8 Drawing Sheets

(56) References Cited

U.S. PATENT DOCUMENTS

| | | | |
|---|---|---|---|
| 2014/0100343 A1* | 4/2014 | Ker | B32B 27/22 |
| | | | 526/170 |
| 2014/0179873 A1 | 6/2014 | Lam | |
| 2018/0305530 A1 | 10/2018 | Wang | |
| 2022/0025135 A1* | 1/2022 | Lue | C08J 5/18 |
| 2023/0416426 A1* | 12/2023 | Joung | C08F 4/025 |

FOREIGN PATENT DOCUMENTS

| | | | |
|---|---|---|---|
| JP | 2016504442 A | 2/2016 | |
| KR | 1020120038798 A | 4/2012 | |
| KR | 10-2017-0004895 A | 1/2017 | |
| KR | 1020200058768 A | 5/2020 | |
| WO | 03010208 A1 | 2/2003 | |
| WO | 2018151790 A1 | 8/2018 | |

OTHER PUBLICATIONS

New substituted titanocene, zirconocene and hafnocene dichlorides Yanlong Qian* and Jiling Huang.
International Search Report dated Mar. 11, 2021.
The Extended European search report issued on Nov. 20, 2023 for corresponding EP Patent Application.
The CN office action issued on Mar. 12, 2024.
KR OA dated Aug. 5, 2022.

* cited by examiner

[Fig. 1]
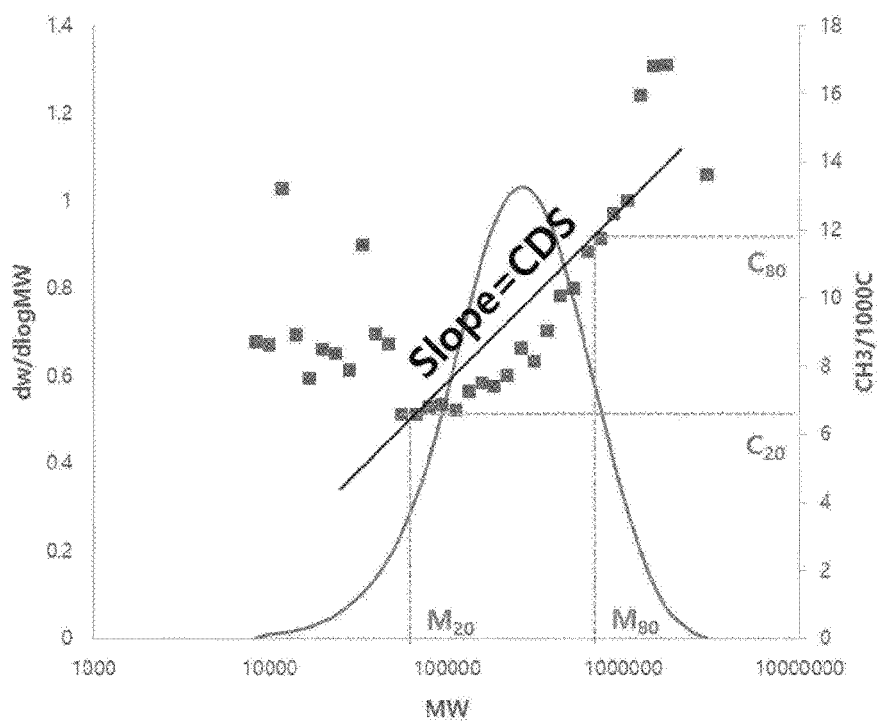

[Fig. 2]
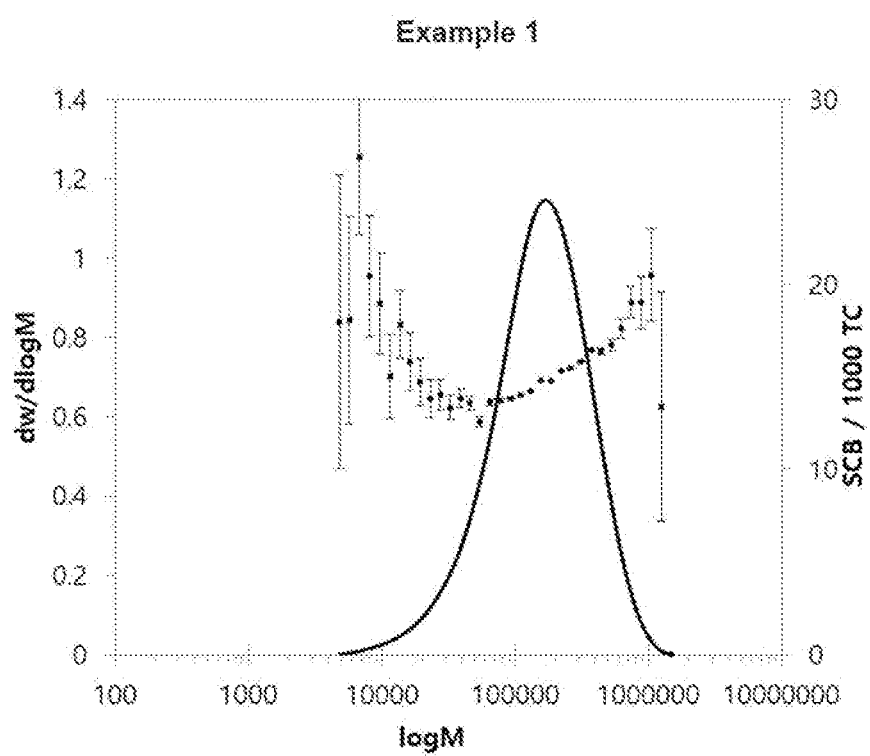

[Fig. 3]
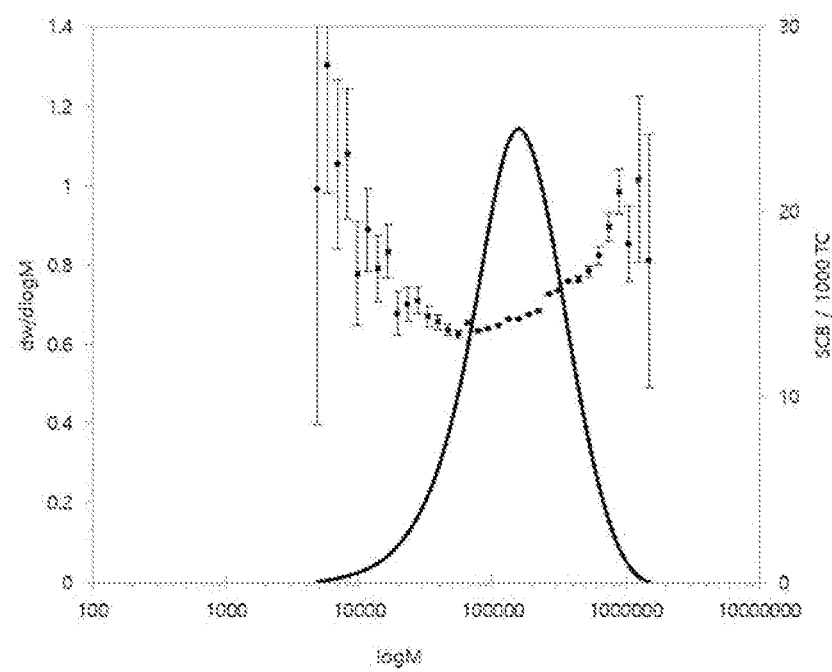

[Fig. 4]
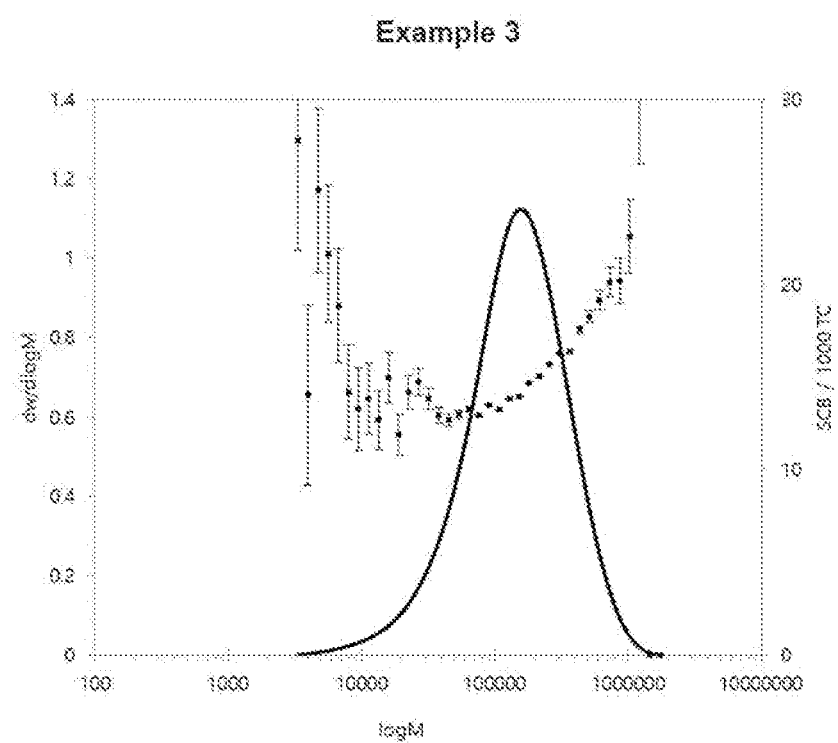

[Fig. 5]
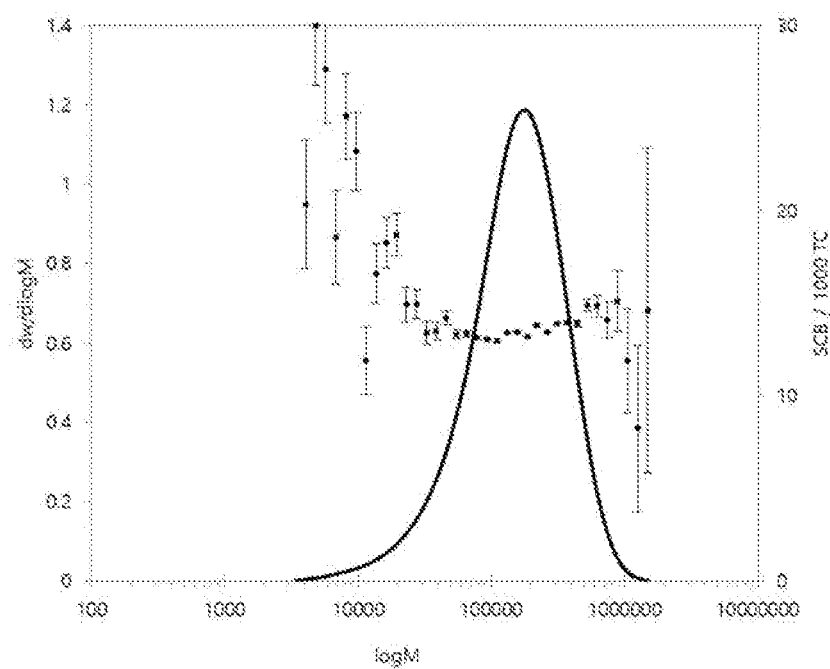

[Fig. 6]
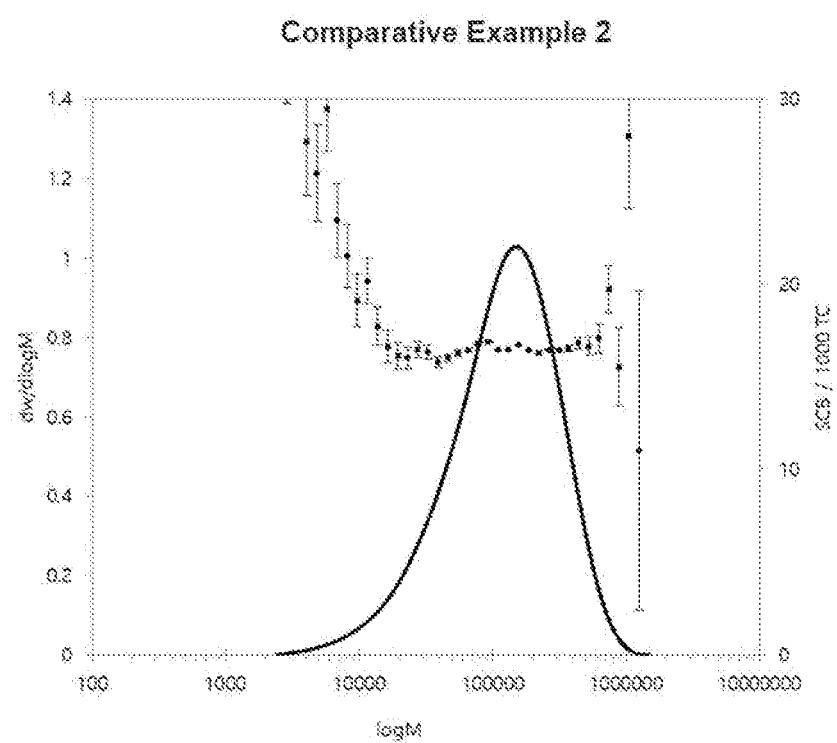

[Fig. 7]
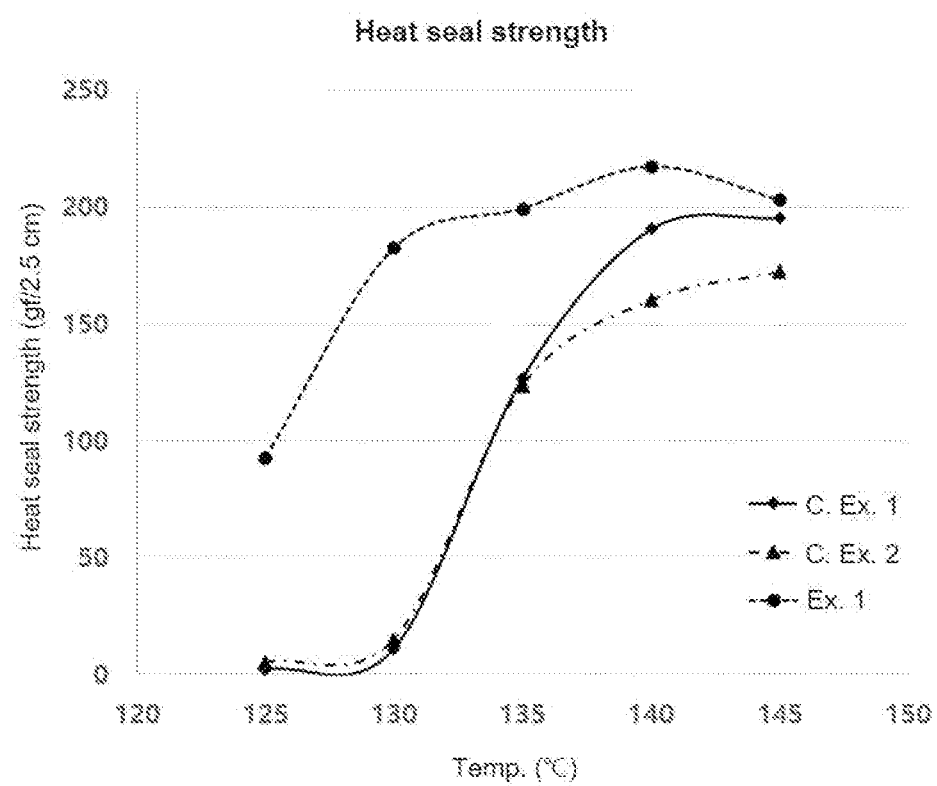

[Fig. 8]
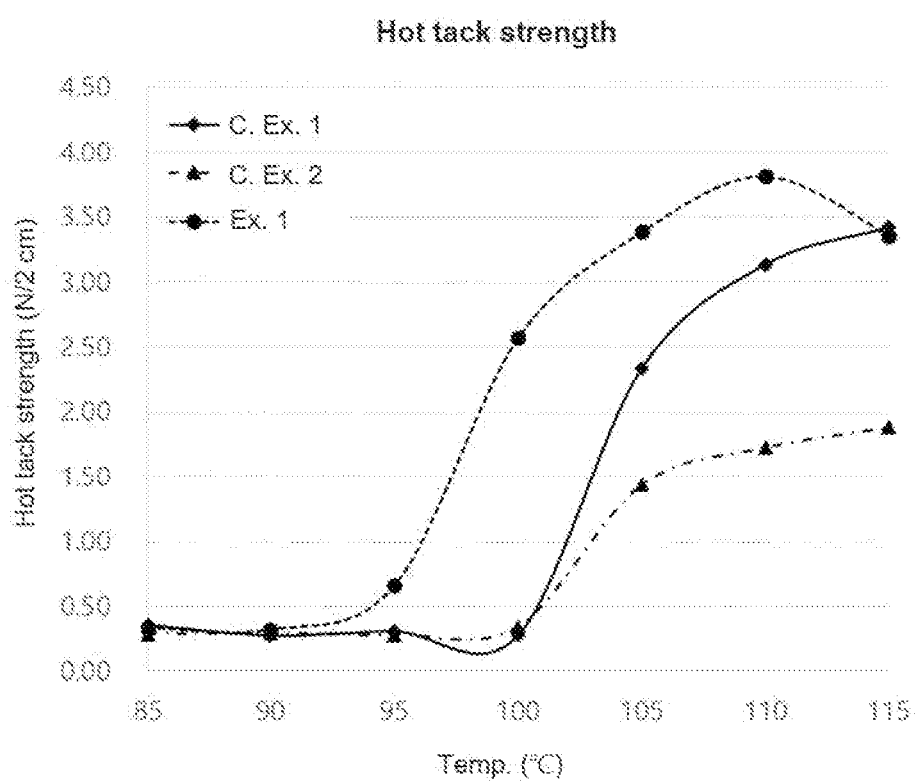

POLYOLEFIN FILM AND PROCESS FOR PREPARING THE SAME

CROSS-REFERENCE TO RELATED APPLICATIONS

This application is a National Stage of International Application No. PCT/KR2020/016424 filed Nov. 20, 2020, claiming priority based on Korean Patent Application No. 10-2019-0155703 filed Nov. 28, 2019, the disclosure of which is incorporated herein by reference in its entirety.

TECHNICAL FIELD

The present invention relates to a polyolefin film and to a process for preparing the same. Specifically, the present invention relates to a polyolefin film that is readily molded and has excellent heat seal strength, in particular, low-temperature heat seal strength, and to a process for preparing the same.

BACKGROUND ART

A metallocene catalyst, which is one of the catalysts used in the polymerization of olefins, is a compound in which a ligand such as cyclopentadienyl, indenyl, and cycloheptadienyl is coordinated to a transition metal or a transition metal halide compound. It has a sandwich structure in its basic form.

In a Ziegler-Natta catalyst, which is another catalyst used in the polymerization of olefins, the metal component serving as the active sites is dispersed on an inert solid surface, whereby the properties of the active sites are not uniform. On the other hand, since a metallocene catalyst is a single compound having a specific structure, it is known as a single-site catalyst in which all active sites have the same polymerization characteristics. A polymer prepared by such a metallocene catalyst is characterized by a narrow molecular weight distribution, a uniform distribution of comonomers, and a higher copolymerization activity than Ziegler-Natta catalysts.

Meanwhile, a linear low-density polyethylene (LLDPE) is produced by copolymerizing ethylene and an alpha-olefin at a low pressure using a polymerization catalyst. It has a narrow molecular weight distribution and short chain branches (SCBs) having a certain length, but generally does not have long chain branches (LCBs). Films prepared from a linear low-density polyethylene have high strength at breakage, elongation, tear strength, and impact strength in addition to the characteristics of common polyethylene. They are widely used for stretch films and overlap films to which conventional low-density polyethylene or high-density polyethylene is hardly applicable.

However, a linear low-density polyethylene produced by a metallocene catalyst has a narrow molecular weight distribution, resulting in poor processability, and a film produced therefrom tends to have deteriorated heat seal characteristics.

Accordingly, there is a demand for a polyolefin film that is readily molded and has excellent mechanical strength and excellent heat seal characteristics, in particular, excellent low-temperature heat seal characteristics.

DETAILED DESCRIPTION OF THE INVENTION

Technical Problem

An object of the present invention is to provide a polyolefin film, in particular, a linear low-density polyethylene film that is readily molded and has excellent mechanical strength and excellent heat seal characteristics, in particular, excellent low-temperature heat seal characteristics.

Another object of the present invention is to provide a process for preparing a polyolefin film, in particular, a linear low-density polyethylene film that is readily molded and has excellent mechanical strength and excellent heat seal characteristics, in particular, excellent low-temperature heat seal characteristics.

Technical Solution

According to an embodiment of the present invention to accomplish the object, there is provided a polyolefin film, which is molded from a polyolefin having (1) a density of 0.910 to 0.940 g/cm$^3$, preferably, 0.910 to 0.920 g/cm$^3$; (2) a melt flow ratio (MFR) of 10 to 60, preferably, 20 to 40, when measured at 190° C. as a ratio of the melt index ($I_{21.6}$) under a load of 21.6 kg to the melt index ($I_{2.16}$) under a load of 2.16 kg; and (3) a comonomer distribution slope (CDS) of 1 or more, preferably, 2 to 5, as defined by Equation 1, wherein the film has a heat seal strength of 90 gf/2.5 cm or more, preferably, 90 to 200 gf/2.5 cm, when measured at 0.2 bar, 1.5 seconds, and 125° C., and a heat seal strength of 210 gf/2.5 cm or more, preferably, 210 to 250 gf/2.5 cm, when measured at 0.2 bar, 1.5 seconds, and 140° C.

$$CDS = \frac{\log C_{80} - \log C_{20}}{\log M_{80} - \log M_{20}} \quad \text{[Equation 1]}$$

Here, $C_{20}$ and $C_{80}$ are the comonomer contents at the point where the cumulative weight fraction in the comonomer distribution is 20% and 80%, respectively, and $M_{20}$ and $M_{80}$ are the molecular weights at which the cumulative weight fraction in the comonomer distribution is 20% and 80%, respectively.

The polyolefin may be prepared by polymerizing an olefinic monomer in the presence of a catalyst comprising at least one transition metal compound represented by Formula 1 and at least one cocatalyst compound.

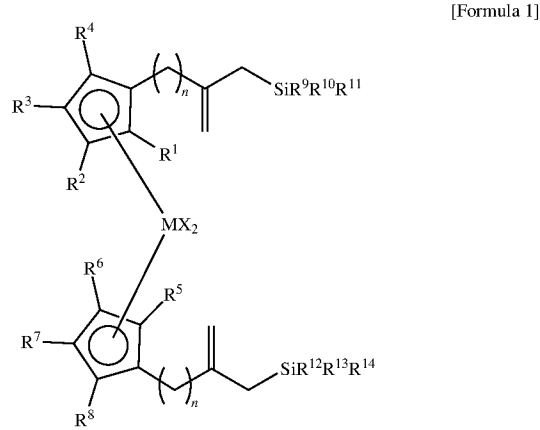

[Formula 1]

In Formula 1, n is each independently an integer of 1 to 20,

M is titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, $R^1$ to $R^4$ and $R^5$ to $R^8$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, $R^9$ to $R^{11}$ and $R^{12}$ to $R^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, and $R^1$ to $R^4$ and $R^5$ to $R^8$ are each independently capable of being linked to adjacent groups to form a substituted or unsubstituted saturated or unsaturated $C_{4-20}$ ring.

Meanwhile, the cocatalyst compound may be selected from the group consisting of a compound represented by Formula 2, a compound represented by Formula 3, and a compound represented by Formula 4.

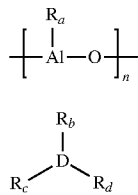

[Formula 2]

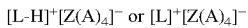

[Formula 3]

[L-H]$^+$[Z(A)$_4$]$^-$ or [L]$^+$[Z(A)$_4$]$^-$ [Formula 4]

In Formula 2, n is an integer of 2 or more, and $R_a$ may each independently be a halogen atom, $C_{1-20}$ hydrocarbon, or $C_{1-20}$ hydrocarbon substituted with halogen.

In Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy.

In Formula 4, L is a neutral or cationic Lewis acid, [L-H]$^+$ and [L]$^+$ a Brönsted acid, Z is a group 13 element, and A is each independently substituted or unsubstituted $C_{6-20}$ aryl or substituted or unsubstituted $C_{1-20}$ alkyl.

In addition, the catalyst may further comprise a carrier for supporting the transition metal compound and the cocatalyst compound.

Preferably, the polyolefin is a copolymer of an olefinic monomer and an olefinic comonomer. Specifically, the olefinic monomer is ethylene, and the olefinic comonomer is at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene. Preferably, the polyolefin is a linear low-density polyethylene in which the olefinic monomer is ethylene, and the olefinic comonomer is 1-hexene.

Preferably, the polyolefin film according to an embodiment of the present invention has a hot tack strength at 95° C. of 0.5 N/2 cm or more, preferably, 0.5 to 3.5 N/2 cm, and a hot tack strength at 110° C. of 3.5 N/2 cm or more, preferably, 3.5 to 7.5 N/2 cm.

Preferably, the polyolefin film according to an embodiment of the present invention may have a haze of 10% or less, preferably, 7% or less or 6% or less, when measured based on a thickness of 50 μm.

Specifically, the film according to an embodiment of the present invention may be at least one selected from the group consisting of a stretch film, an overlap film, a lamination, a silage wrap, an agricultural film, and the like.

According to another embodiment of the present invention, there is provided a process for preparing a polyolefin film, which comprises (a) polymerizing an olefinic monomer in the presence of a catalyst comprising at least one transition metal compound represented by Formula 1 and at least one cocatalyst compound to obtain a polyolefin; and (b) molding the polyolefin to obtain a film, wherein the polyolefin has (1) a density of 0.910 to 0.940 g/cm³, preferably, 0.910 to 0.920 g/cm³; (2) a melt flow ratio (MFR) of 10 to 60, preferably, 20 to 40, when measured at 190° C. as a ratio of the melt index ($I_{21.6}$) under a load of 21.6 kg to the melt index ($I_{2.16}$) under a load of 2.16 kg; and (3) a comonomer distribution slope (CDS) of 1 or more, preferably, 2 to 5, as defined by Equation 1, and the film has a heat seal strength of 90 gf/2.5 cm or more, preferably, 90 to 200 gf/2.5 cm, when measured at 0.2 bar, 1.5 seconds, and 125° C., and a heat seal strength of 210 gf/2.5 cm or more, preferably, 210 to 250 gf/2.5 cm, when measured at 0.2 bar, 1.5 seconds, and 140° C.

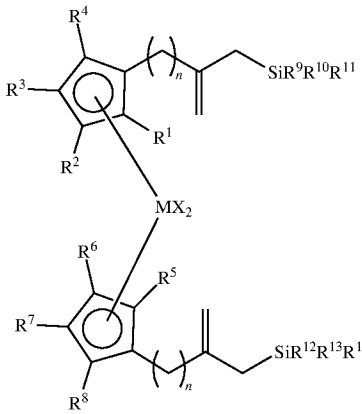

[Formula 1]

$$CDS = \frac{\log C_{80} - \log C_{20}}{\log M_{80} - \log M_{20}}$$

[Equation 1]

n, M, X, and $R^1$ to $R^{14}$ of Formula 1 and $C_{20}$, $C_{80}$, $M_{20}$, and $M_{80}$ of Formula 1 are as defined above.

In step (a), the polymerization of an olefinic monomer may be carried out by gas-phase polymerization. Specifically, the polymerization of an olefinic monomer may be carried out in a gas-phase fluidized bed reactor.

In step (a), the polyolefin may be prepared by copolymerizing an olefinic monomer and an olefinic comonomer.

Here, the olefinic monomer may be ethylene, and the olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene. Preferably, the olefinic monomer is ethylene, and the olefinic comonomer is 1-hexene.

The polyolefin film prepared by the process for preparing a polyolefin film according to an embodiment of the present invention has a hot tack strength at 95° C. of 0.5 N/2 cm or more, preferably, 0.5 to 3.5 N/2 cm, and a hot tack strength at 110° C. of 3.5 N/2 cm or more, preferably, 3.5 to 7.5 N/2 cm.

Advantageous Effects of the Invention

The polyolefin film, in particular, the linear low-density polyethylene film according to an embodiment of the present invention is readily molded and has excellent mechanical strength and excellent heat seal characteristics, in particular, excellent low-temperature heat seal characteristics.

BRIEF DESCRIPTION OF THE DRAWING

FIG. 1 is a GPC-FTIR graph for explaining a method of measuring CDS defined by Equation 1.

FIGS. 2 to 4 are GPC-FTIR graphs for measuring the CDS of the polyolefins of Examples 1 to 3, respectively.

FIGS. 5 and 6 are GPC-FTIR graphs for measuring the CDS of the polyolefins of Comparative Examples 1 and 2, respectively.

FIG. 7 is a graph showing the heat seal strength of Example 1, Comparative Example 1, and Comparative Example 2.

FIG. 8 is a graph showing the hot tack strength of Example 1, Comparative Example 1, and Comparative Example 2.

BEST MODE FOR CARRYING OUT THE INVENTION

Hereinafter, the present invention will be described in more detail.

Polyolefin Film

The polyolefin film according to an embodiment of the present invention is prepared by molding a polyolefin.

Here, the polyolefin for preparing the polyolefin film according to an embodiment of the present invention may be prepared by polymerizing an olefinic monomer in the presence of a catalyst.

Catalyst for Olefin Polymerization

The catalyst for preparing a polyolefin, in particular, a linear low-density polyethylene, for preparing a polyolefin film according to an embodiment of the present invention comprises at least one transition metal compound represented by Formula 1 and at least one cocatalyst compound.

[Formula 1]

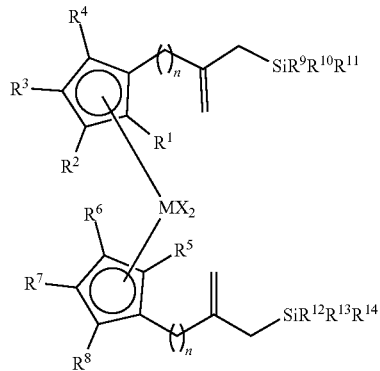

In Formula 1, n is each independently an integer of 1 to 20, preferably an integer of 1 to 10, more preferably an integer of 1 to 5. Specifically, n may each be 1 or 2.

M is titanium (Ti), zirconium (Zr), or hafnium (Hf). Specifically, M may be zirconium or hafnium.

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene. Specifically, X may each be halogen or substituted or unsubstituted $C_{1-20}$ alkyl. More specifically, X may each be chlorine, a methyl group, or a butyl group.

$R^1$ to $R^4$ and $R^5$ to $R^8$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl. In addition, $R^1$ to $R^4$ and $R^5$ to $R^8$ are each independently capable of being linked to adjacent groups to form a substituted or unsubstituted saturated or unsaturated $C_{4-20}$ ring. Specifically, $R^1$ to $R^4$ and $R^5$ to $R^8$ may each be hydrogen.

$R^9$ to $R^{11}$ and $R^{12}$ to $R^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl.

Specifically, $R^9$ to $R^{11}$ and $R^{12}$ to $R^{14}$ may each be substituted or unsubstituted $C_{1-20}$ alkyl or substituted or unsubstituted $C_{6-20}$ aryl. More specifically, $R^9$ to $R^{11}$ and $R^{12}$ to $R^{14}$ may each be a methyl group or a phenyl group.

In a preferred embodiment of the present invention, the compound represented by Formula 1 may be any one of the compounds represented by Formulae 1-1 to 1-8.

[Formula 1-1]

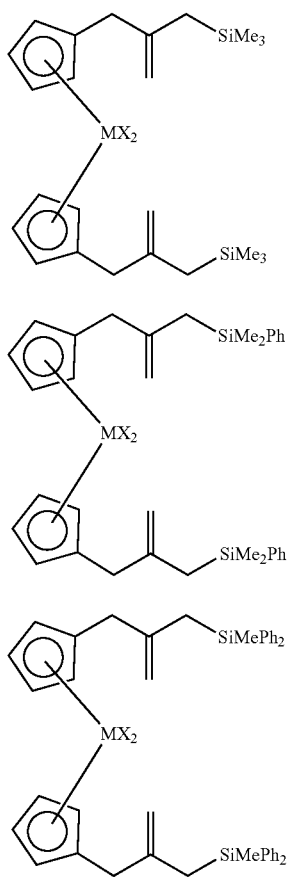

[Formula 1-2]

[Formula 1-3]

[Formula 1-4]

[Formula 1-5]

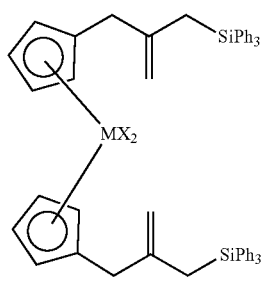

[Formula 1-6]

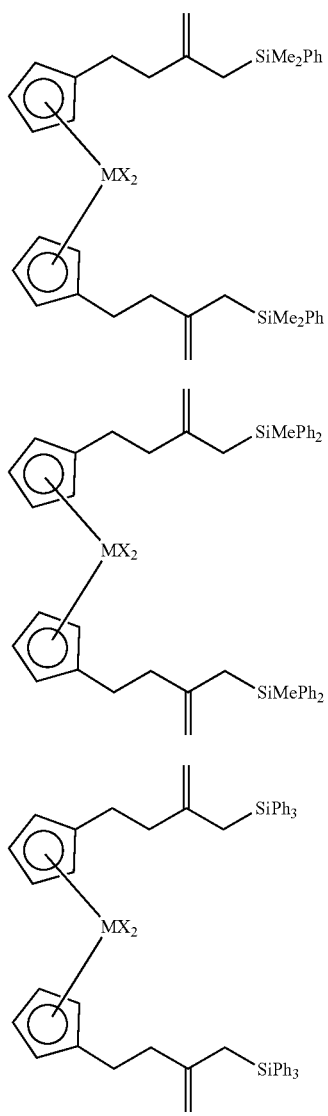

[Formula 1-7]

[Formula 1-8]

In Formulae 1-1 to 1-8 above, M is zirconium or hafnium, X is each halogen or substituted or unsubstituted $C_{1-20}$ alkyl, preferably chlorine, a methyl group, or a butyl group, Me is a methyl group, and Ph is a phenyl group.

In a more preferred embodiment of the present invention, the compound represented by Formula 1 may be any one of the compounds represented by Formulae 1-9 to 1-11.

[Formula 1-9]

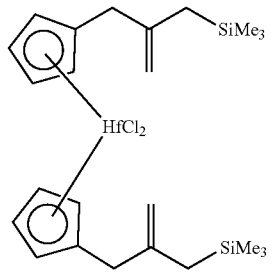

-continued

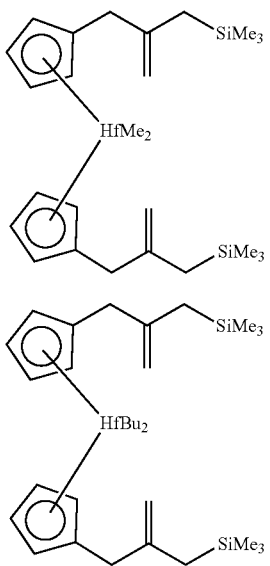

[Formula 1-10]

[Formula 1-11]

In Formulae 1-9 to 1-11, Me is a methyl group, and Ph is a phenyl group.

Meanwhile, the cocatalyst compound may comprise at least one of a compound represented by Formula 2, a compound represented by Formula 3, and a compound represented by Formula 4.

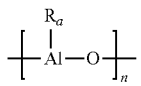

[Formula 2]

In Formula 2, n is an integer of 2 or more, and $R_a$ may each independently be halogen, $C_{1-20}$ hydrocarbon, or $C_{1-20}$ hydrocarbon substituted with halogen. Specifically, $R_a$ may be methyl, ethyl, n-butyl, or isobutyl.

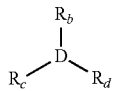

[Formula 3]

In Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy. Specifically, when D is aluminum (Al), $R_b$, $R_c$, and $R_d$ may each independently be methyl or isobutyl, and when D is boron (B), $R_b$, $R_c$, and $R_d$ may each be pentafluorophenyl.

$[L-H]^+[Z(A)_4]^-$ or $[L]^+[Z(A)_4]^-$   [Formula 4]

In Formula 4, L is a neutral or cationic Lewis acid, $[L-H]^+$ and $[L]^+$ a Brönsted acid, Z is a group 13 element, and A is each independently substituted or unsubstituted $C_{6-20}$ aryl or substituted or unsubstituted $C_{1-20}$ alkyl. Specifically, $[LH]^+$ may be a dimethylanilinium cation, $[Z(A)_4]^-$ may be $[B(C_6F_5)_4]^-$, and $[L]^+$ may be $[(C_6H_5)_3C]^+$.

Specifically, examples of the compound represented by Formula 2 include methylaluminoxane, ethylaluminoxane, isobutylaluminoxane, butylaluminoxane, and the like. Preferred is methylaluminoxane. But it is not limited thereto.

Examples of the compound represented by Formula 3 include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentyaluminum, trihexyaluminum, trioctyaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, and tributylboron. Preferred are trimethylaluminum, triethylaluminum, and triisobutylaluminum. But it is not limited thereto.

Examples of the compound represented by Formula 4 include triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra (o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, trimethylphosphonium tetraphenylborate, triethylammonium tetraphenylaluminate, tributylammonium tetraphenylaluminate, trimethylammonium tetraphenylaluminate, tripropylammonium tetraphenylaluminate, trimethylammonium tetra(p-tolyl)aluminate, tripropylammonium tetra(p-tolyl)aluminate, triethylammonium tetra(o,p-dimethylphenyl)aluminate, tributylammonium tetra(p-trifluoromethylphenyl)aluminate, trimethylammonium tetra (p-trifluoromethylphenyl)aluminate, tributylammonium tetrapentafluorophenylaluminate, N,N-diethylanilinium tetraphenylaluminate, N,N-diethylanilinium tetrapentafluorophenylaluminate, diethylammonium tetrapentatetraphenylaluminate, triphenylphosphonium tetraphenylaluminate, trimethylphosphonium tetraphenylaluminate, tripropylammonium tetra(p-tolyl)borate, triethylammonium tetra(o,p-dimethylphenyl)borate, triphenylcarbonium tetra(p-trifluoromethylphenyl)borate, and triphenylcarbonium tetrapentafluorophenylborate.

In a preferred embodiment of the present invention, the catalyst for olefin polymerization may further comprise a carrier for supporting the transition metal compound. Specifically, the carrier may support both of the transition metal compound and the cocatalyst.

In such an event, the carrier may comprise a material containing a hydroxyl group on its surface. Preferably, a material that has been dried to remove moisture from its surface and has a highly reactive hydroxyl group and a siloxane group may be used. For example, the carrier may comprise at least one selected from the group consisting of silica, alumina, and magnesia. Specifically, silica, silica-alumina, and silica-magnesia dried at high temperatures may be used as a carrier. They usually contain oxides, carbonates, sulfates, and nitrates components such as $Na_2O$, $K_2CO_3$, $BaSO_4$, and $Mg(NO_3)_2$. In addition, they may comprise carbon, zeolite, magnesium chloride, and the like. However, the carrier is not limited thereto. It is not particularly limited as long as it can support the transition metal compound and the cocatalyst compound.

The carrier may have an average particle size of 10 to 250 μm, preferably an average particle size of 10 to 150 μm, and more preferably 20 to 100 μm.

The carrier may have a micropore volume of 0.1 to 10 cc/g, preferably 0.5 to 5 cc/g, and more preferably 1.0 to 3.0 cc/g.

The carrier may have a specific surface area of 1 to 1,000 $m^2/g$, preferably 100 to 800 $m^2/g$, more preferably 200 to 600 $m^2/g$.

In a preferred example, when the carrier is silica, the drying temperature of the silica may be 200 to 900° C. The drying temperature may preferably be 300 to 800° C., more preferably 400 to 700° C. If the drying temperature is lower than 200° C., there would be too much moisture so that the moisture on the surface and the cocatalyst may react. If it exceeds 900° C., the structure of the carrier may collapse.

The dried silica may have a concentration of hydroxy groups of 0.1 to 5 mmole/g, preferably 0.7 to 4 mmole/g, and more preferably 1.0 to 2 mmole/g. If the concentration of hydroxy groups is less than 0.1 mmole/g, the supported amount of the cocatalyst may be low. If it exceeds 5 mmole/g, there may arise a problem that the catalyst component may be deactivated.

The amount of the transition metal compound supported on a carrier may be 0.001 to 1 mmole based on 1 g of the carrier. When the content ratio of the transition metal compound and the carrier satisfies the above range, an appropriate activity of the supported catalyst may be exhibited, which is advantageous from the viewpoint of maintaining the activity of the catalyst and economical efficiency.

The amount of the cocatalyst compound supported on a carrier may be 2 to 15 mmoles based on the 1 g of the carrier. When the content ratio of the cocatalyst compound and the carrier satisfies the above range, it is advantageous from the viewpoint of maintaining the activity of the catalyst and economical efficiency.

One or two or more types of a carrier may be used. For example, both the transition metal compound and the cocatalyst compound may be supported on one type of a carrier, or the transition metal compound and the cocatalyst compound may be supported on two or more types of a carrier, respectively. In addition, either one of the transition metal compound and the cocatalyst compound may be supported on a carrier.

As a method of supporting the transition metal compound and the cocatalyst compound employed in a catalyst for olefin polymerization on the carrier, a physical adsorption method or a chemical adsorption method may be used.

For example, the physical adsorption method may be a method of contacting a solution in which a transition metal compound has been dissolved with a carrier and then drying the same; a method of contacting a solution in which a transition metal compound and a cocatalyst compound have been dissolved with a carrier and then drying the same; or a method of contacting a solution in which a transition metal compound has been dissolved with a carrier and then drying the same to prepare the carrier that supports the transition metal compound, separately contacting a solution in which a cocatalyst compound has been dissolved with a carrier and then drying the same to prepare the carrier that supports the cocatalyst compound, and then mixing them.

The chemical adsorption method may be a method of supporting a cocatalyst compound on the surface of a carrier, and then supporting a transition metal compound on the cocatalyst compound; or a method of covalently bonding a functional group on the surface of a carrier (e.g., a hydroxy group (—OH) on the silica surface in the case of silica) with a catalyst compound.

Polyolefin

Here, the polyolefin prepared by polymerizing an olefinic monomer in the presence of the catalyst for olefin polymerization as described above may be a homopolymer of an olefinic monomer or a copolymer of an olefinic monomer and an olefinic comonomer.

The olefinic monomer is at least one selected from the group consisting of a $C_{2-20}$ alpha-olefin, a $C_{1-20}$ diolefin, a $C_{3-20}$ cycloolefin, and a $C_{3-20}$ cyclodiolefin.

For example, the olefinic monomer may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or the like, and the polyolefin may be a homopolymer comprising only one olefinic monomer or a copolymer comprising two or more olefinic monomers exemplified above.

As an exemplary example, the polyolefin may be a copolymer in which ethylene and a $C_{3-20}$ alpha-olefin are copolymerized. Preferred is a copolymer in which ethylene and 1-hexene are copolymerized. But it is not limited thereto.

In such an event, the content of ethylene is preferably 55 to 99.9% by weight, more preferably 90 to 99.9% by weight. The content of the alpha-olefinic comonomer is preferably 0.1 to 45% by weight, more preferably 0.1 to 10% by weight.

The polyolefin according to an embodiment of the present invention may be prepared by a polymerization reaction such as free radical, cationic, coordination, condensation, and addition, but it is not limited thereto.

As an example of the present invention, the polyolefin may be prepared by a gas phase polymerization method, a solution polymerization method, a slurry polymerization method, or the like. Preferably, the polymerization of an olefinic monomer may be carried out by gas-phase polymerization. Specifically, the polymerization of an olefinic monomer may be carried out in a gas-phase fluidized bed reactor.

When the polyolefin is prepared by a solution polymerization method or a slurry polymerization method, examples of a solvent that may be used include $C_{5-12}$ aliphatic hydrocarbon solvents such as pentane, hexane, heptane, nonane, decane, and isomers thereof; aromatic hydrocarbon solvents such as toluene and benzene; hydrocarbon solvents substituted with chlorine atoms such as dichloromethane and chlorobenzene; and mixtures thereof, but it is not limited thereto.

The polyolefin for preparing a polyolefin film according to an embodiment of the present invention has (1) a density of 0.910 to 0.940 $g/cm^3$; (2) a melt flow ratio (MFR) of 10 to 60 when measured at 190° C. as a ratio of the melt index ($I_{21.6}$) under a load of 21.6 kg to the melt index ($I_{2.16}$) under a load of 2.16 kg; and (3) a comonomer distribution slope (CDS) of 1 or more as defined by Equation 1.

Specifically, the polyolefin may have a density of 0.910 to 0.940 $g/cm^3$. Preferably, the density of the polyolefin may be 0.910 to 0.920 $g/cm^3$ or 0.915 to 0.925 $g/cm^3$.

In addition, the polyolefin may have a melt flow ratio (MFR) of 10 to 60 when measured at 190° C. as a ratio of the melt index ($I_{21.6}$) under a load of 21.6 kg to the melt index ($I_{2.16}$) under a load of 2.16 kg. Preferably, the MFR of the polyolefin may be 20 to 50 or 20 to 40.

In addition, the polyolefin may have a comonomer distribution slope (CDS) of 1 or more as defined by Equation 1. Preferably, the CDS of the polyolefin may be 2 to 5 or 2 to 4.

$$CDS = \frac{\log C_{80} - \log C_{20}}{\log M_{80} - \log M_{20}} \quad \text{[Equation 1]}$$

In Equation 1, $C_{20}$ and $C_{80}$ are the comonomer contents at the point where the cumulative weight fraction in the comonomer distribution is 20% and 80%, respectively, and $M_{20}$ and $M_{80}$ are the molecular weights at which the cumulative weight fraction in the comonomer distribution is 20% and 80%, respectively.

Here, the comonomer distribution of the polyolefin may be continuously measured together with the molecular weight and molecular weight distribution of the polymer using GPC-FTIR equipment.

The CDS of a polyolefin indicates the slope of the comonomer content with respect to the molecular weight at the points where the cumulative weight fraction is 20% and 80%, respectively, in the comonomer distribution graph. As the CDS of a polyolefin increases, the comonomer is concentrated in the polymer chain having a high molecular weight, so that it can have excellent mechanical strength and heat seal properties.

Polyolefin Film

The polyolefin film according to an embodiment of the present invention may be prepared by molding the polyolefin described above.

Since the polyolefin film according to an embodiment of the present invention comprises the polyolefin described above, it is excellent in mechanical properties and heat seal characteristics. It is understood that since the polyolefin described above has a relatively wide molecular weight distribution, and since short chain branches are relatively more present in the high molecular weight components, a polyolefin film produced therefrom is excellent in mechanical properties and heat seal characteristics.

Specifically, the polyolefin film according to an embodiment of the present invention has a heat seal strength of 90 gf/2.5 cm or more, preferably, 90 to 200 gf/2.5 cm, more preferably, 90 to 180 gf/2.5 cm, when measured at 0.2 bar, 1.5 seconds, and 125° C. in accordance with ASTM F88. The polyolefin film according to an embodiment of the present invention has a heat seal strength of 210 gf/2.5 cm or more, preferably, 210 to 250 gf/2.5 cm, more preferably, 210 to 230 gf/2.5 cm, when measured at 0.2 bar, 1.5 seconds, and 140° C. in accordance with ASTM F88.

In addition, the polyolefin film according to an embodiment of the present invention has a hot tack strength at 95° C. of 0.5 N/2 cm or more, preferably, 0.5 to 3.5 N/2 cm, more preferably, 0.5 to 2.0 N/2 cm, when measured in accordance with ASTM F1921. The polyolefin film according to an embodiment of the present invention has a hot tack strength at 110° C. of 3.5 N/2 cm or more, preferably, 3.5 to 7.5 N/2 cm, more preferably, 3.5 to 5.0 N/2 cm, when measured in accordance with ASTM F1921.

In addition, the polyolefin film according to an embodiment of the present invention may have a haze of 10% or less when measured based on a thickness of 50 μm in accordance with ASTM D 1003. Preferably, the haze of the polyolefin film according to an embodiment of the present invention may be 7% or less or 6% or less.

The polyolefin film according to an embodiment of the present invention can be advantageously used as a stretch film, an overlap film, a lamination, a silage wrap, an agricultural film, and the like.

Process for Preparing a Polyolefin Film

According to another embodiment of the present invention, there is provided a process for preparing a polyolefin film, which comprises (a) polymerizing an olefinic monomer in the presence of a catalyst comprising at least one transition metal compound represented by Formula 1 and at least one cocatalyst compound to obtain a polyolefin; and (b) molding the polyolefin to obtain a film, wherein the polyolefin has (1) a density of 0.910 to 0.940 g/cm³, preferably, 0.910 to 0.920 g/cm³; (2) a melt flow ratio (MFR) of 10 to 60, preferably, 20 to 40, when measured at 190° C. as a ratio of the melt index ($I_{21.6}$) under a load of 21.6 kg to the melt index ($I_{2.16}$) under a load of 2.16 kg; and (3) a comonomer distribution slope (CDS) of 1 or more, preferably, 2 to 5, as defined by Equation 1, and the film has a heat seal strength of 90 gf/2.5 cm or more, preferably, 90 to 200 gf/2.5 cm, when measured at 0.2 bar, 1.5 seconds, and 125° C., and a heat seal strength of 210 gf/2.5 cm or more, preferably, 210 to 250 gf/2.5 cm, when measured at 0.2 bar, 1.5 seconds, and 140° C.

[Formula 1]

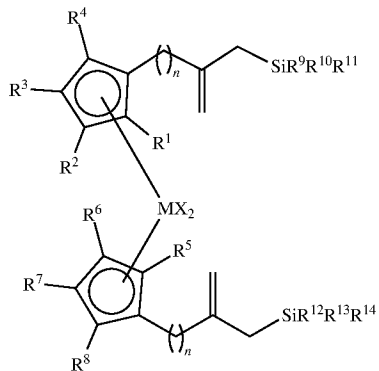

$$CDS = \frac{\log C_{80} - \log C_{20}}{\log M_{80} - \log M_{20}} \quad \text{[Equation 1]}$$

n, M, X, and $R^1$ to $R^{14}$ of Formula 1 and $C_{20}$, $C_{80}$, $M_{20}$, and $M_{80}$ of Formula 1 are as defined above.

In step (a), the polyolefin may be prepared by a gas phase polymerization method, a solution polymerization method, a slurry polymerization method, or the like. Preferably, the polymerization of an olefinic monomer may be carried out by gas-phase polymerization. Specifically, the polymerization of an olefinic monomer may be carried out in a gas-phase fluidized bed reactor.

In step (a), the polyolefin may be prepared by copolymerizing an olefinic monomer and an olefinic comonomer. Here, the olefinic monomer may be ethylene, and the olefinic comonomer may be at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene. Preferably, the olefinic monomer is ethylene, and the olefinic comonomer is 1-hexene.

In step (b), there is no particular limitation to the method for producing a polyolefin film according to an embodiment of the present invention, and any method known in the technical field of the present invention can be used. For example, the polyolefin described above may be molded by a conventional method such as blown film molding, extrusion molding, casting molding, or the like to prepare a polyolefin film Blown film molding among the above is the most preferred.

The polyolefin film prepared by the process for preparing a polyolefin film according to an embodiment of the present invention has a hot tack strength at 95° C. of 0.5 N/2 cm or more, preferably 0.5 to 3.5 N/2 cm, more preferably 0.5 to 2.0 N/2 cm, and a hot tack strength at 110° C. of 3.5 N/2 cm or more, preferably 3.5 to 7.5 N/2 cm, more preferably 3.5 to 5.0 N/2 cm, when measured in accordance with ASTM F1921.

EMBODIMENTS FOR CARRYING OUT THE INVENTION

Example

Hereinafter, the present invention will be described in detail with reference to Examples, However, the following examples are intended to further illustrate the present invention. The scope of the present invention is not limited thereto only.

Preparation Example 1: Preparation of bis[(2-trimethylsilylm ethylallyl)cyclopentadienyl] hafnium dichloride (Formula 1-9)

Preparation of 2-(trimethylsilylmethyl)-2-propen-1-ol

An aqueous solution of potassium carbonate ($K_2CO_3$) (6.6 M, 14 4 mmoles) was slowly added to a solution of 2-(trimethylsilylmethyl)allyl acetate (2.69 g, 14 4 mmoles) in methanol (22 ml). Upon completion of the addition, it was stirred at room temperature for 4 hours. After stirring, water was added thereto to terminate the reaction. The organic layer was extracted with diethyl ether, and residual water was removed using magnesium sulfate ($MgSO_4$). All solvents were removed under vacuum to obtain 1.51 g (72%) of a pale beige oily compound.

$^1$H-NMR ($CDCl_3$, 300 MHz): δ 4.90-4.88 (m, 1H), 4.66 (s, 1H), 3.97 (s, 2H), 1.53 (s, 2H), 0.03 (s, 9H).

Preparation of 2-(trimethylsilylmethyl) methanesulfonate

Methanesulfonyl chloride (1.8 g, 15 7 mmoles) was slowly added at 0° C. to a solution in which 2-(trimethylsilylmethyl)-2-propen-1-ol (1.51 g, 10 5 mmoles) and triethylamine (1.91 g, 18.8 mmoles) had been diluted in dichloromethane (30 ml). Thereafter, it was stirred at 0° C. for 3 hours. An aqueous solution of sodium hydrogen carbonate ($NaHCO_3$) was added thereto at 0° C. to terminate the reaction, and the organic layer was then extracted with dichloromethane Residual water was removed using sodium sulfate ($Na_2SO_4$), and all solvents were removed under vacuum to obtain 1.9 g (82%) of a yellow oily compound.

$^1$H-NMR ($CDCl_3$, 300 MHz): δ 5.03 (d, 1H), 4.84 (s, 1H), 4.56 (s, 2H), 3.02 (s, 3H), 1.60 (s, 2H), 0.06 (s, 9H).

Preparation of 2-(trimethylsilylmethyl)allyl bromide

A solution of lithium bromide dispersed in tetrahydrofuran (15 ml) was slowly added at room temperature to a solution in which 2-(trimethylsilylmethyl) methanesulfonate (1.9 g, 8.54 mmoles) had been diluted in tetrahydrofuran (20 ml). It was then stirred at 110° C. for 4 hours. Distilled water was added thereto at 0° C. to terminate the reaction, and the organic layer was then extracted with diethyl ether. Residual water was removed using sodium sulfate, and all solvents were removed under vacuum to obtain 1.12 g (65%) of a yellow oily compound.

$^1$H-NMR ($CDCl_3$, 300 MHz): δ 5.04 (s, 1H), 4.74 (d, 1H), 3.90 (d, 2H), 1.72 (d, 2H), 0.05 (s, 9H).

Preparation of [2-(cyclopentadienylmethyl)allyl] trimethylsilane

Sodium cyclopentadienide (3.04 g, 6.49 mmoles, 2M in tetrahydrofuran) was slowly added dropwise at −30° C. to a solution in which 2-(trimethylsilylmethyl)allyl bromide (1.12 g, 5.41 mmoles) had been diluted in tetrahydrofuran (20 ml), and the temperature was slowly raised to room temperature, followed by stirring thereof for 12 hours. Distilled water was added thereto at 0° C. to terminate the reaction, and the organic layer was then extracted with diethyl ether. Residual water was removed using magnesium sulfate, and it was subjected to separation by column chromatography (hexane) to obtain 620 mg (60%) of a pale beige oily compound.

$^1$H-NMR ($CDCl_3$, 300 MHz): δ 6.42-6.02 (m, 4H), 4.60-4.55 (m, 2H), 3.06-2.97 (m, 2H), 2.87-2.85 (m, 2H), 1.54 (s, 2H), 0.03 (d, 9H).

Preparation of [2-(trimethylsilylmethyl)allyl] cyclopentadienyl lithium

N-butyllithium (n-BuLi) (1.44 g, 2.93 mmoles, 1.6 M solution in hexane) was slowly added at −30° C. to a solution of [2-(cyclopentadienylmethyl)allyl] trimethylsilane (620 mg, 3.22 mmoles) diluted in tetrahydrofuran (10 ml), and the temperature was gradually raised to room temperature, followed by stirring thereof for 12 hours. The solvents in the reaction solution were removed under vacuum, hexane was added thereto, followed by stirring thereof for 15 minutes. The resulting solid was filtered and dried under vacuum to obtain 528 mg (83%) of a pale yellow solid compound.

Preparation of bis[(2-trimethylsilylmethylallyl)cyclopentadienyl] hafnium dichloride A solution of hafnium chloride ($HfCl_4$) (226 mg, 0.71 mmole) dispersed in toluene (2 ml) was slowly added at −30° C. to a solution in which [2-(trimethylsilylmethyl)allyl] cyclopentadienyl lithium (280 mg, 1.41 mmoles) had been diluted in toluene (3 ml), and the temperature was slowly raised to room temperature, followed by stirring thereof for 12 hours. Upon completion of the reaction, the reaction solution was filtered, and the solvent of the filtrate was dried under vacuum. The resulting solid was washed with hexane and dried to obtain 180 mg (41%) of a white solid compound.

$^1$H-NMR (CDCl$_3$, 300 MHz): δ 6.21 (t, 2H), 6.12 (t, 2H), 4.54 (d, 2H), 4.44 (d, 1H), 3.28 (s, 2H), 1.52 (s, 2H), 0.05 (s, 9H).

Preparation of a Supported Metallocene Catalyst 624 g of a 10% methylaluminoxane solution in toluene was added to 4.15 g of the compound of Formula 1-9, followed by stirring thereof at room temperature for 1 hour. Upon completion of the reaction, the solution was added to 140 g of silica (XPO-2402), and 3 liters of toluene was further added thereto, followed by stirring thereof at 70° C. for 2 hours. The supported catalyst thus obtained was washed with 1 liter of toluene and dried overnight under vacuum at 60° C. to prepare 200 g of the supported catalyst in powder form.

Preparation Example 2: Preparation of dimethyl bis[(2-trimethylsilylmethylallyl)cyclopentadienyl] hafnium (Formula 1-10)

MeMgBr (3.0 M solution in diethyl ether, 11.4 mmoles) was slowly added at −30° C. to a solution of bis[(2-trimethylsilylmethylallyl)cyclopentadienyl] hafnium dichloride (2.4 g, 3.79 mmoles) prepared in Preparation Example 1 diluted in toluene, and the temperature was slowly raised to room temperature, followed by stirring thereof for 12 hours. Upon completion of the reaction, it was extracted with toluene and then filtered. The solvent of the filtrate was dried under vacuum. The resulting solid was washed with hexane and dried to obtain 2.08 g (93%) of a white solid compound.

200 g of a supported catalyst was prepared in the same manner as in Preparation Example 1, except that 3.87 g of the compound of Formula 1-10 was used.

Preparation Example 3: Preparation of dibutyl bis [(2-trimethylsilylmethylallyl)cyclopentadienyl] hafnium (Formula 1-11)

n-Butyl lithium (5.5 g, 13 mmoles) was slowly added at −30° C. to a solution of bis[(2-trimethylsilylmethylallyl)cyclopentadienyl] hafnium dichloride (4 g, 6 mmoles) prepared in Preparation Example 1 diluted in toluene (100 ml), and the temperature was slowly raised to room temperature, followed by stirring thereof for 12 hours. Upon completion of the reaction, the reaction solution was filtered, and the solvent of the filtrate was dried under vacuum to obtain 3.4 g (80%) of a yellow liquid compound.

200 g of a supported catalyst was prepared in the same manner as in Preparation Example 1, except that 4.43 g of the compound of Formula 1-11 was used.

Examples 1 to 3

An ethylene/1-hexene copolymer was prepared in the presence of each of the supported catalysts obtained in Preparation Examples 1 to 3 in a gas-phase fluidized bed reactor. The partial pressure of ethylene in the reactor was maintained at about 15 kg/cm$^2$, and the polymerization temperature was maintained at 80 to 90° C.

The reaction conditions of the Examples are shown in Table 1 below.

TABLE 1

| | Catalyst feed amount (g) | Ethylene partial pressure (kg/cm$^2$) | Molar ratio of hydrogen/ ethylene (%) | Molar ratio of 1-hexene/ ethylene (%) | Catalytic activity (gPE/ gCat-hr) |
|---|---|---|---|---|---|
| Ex. 1 | 4.12 | 15.0 | 0.04 | 1.35 | 1,700 |
| Ex. 2 | 2.00 | 15.2 | 0.05 | 1.21 | 3,500 |
| Ex. 3 | 3.50 | 14.7 | 0.07 | 1.18 | 2,000 |

Comparative Examples 1 and 2

For comparison, linear low-density polyethylene M1810HN (density 0.918 g/cm$^3$, melt index 1.0 g/10 min) and M2010HN (density 0.920 g/cm$^3$, melt index 1.0 g/10 min) of Hanwha Chemical Corp. were used.

Test Example

The physical properties of the polyolefins prepared in the Examples were measured according to the following methods and standards. The results are shown in Table 2 below.
(1) Melt Index and Melt Flow Ratio (MFR)
It was measured at 190° C. under a load of 21.6 kg and 2.16 kg in accordance with ASTM D1238. Their ratio (MI$_{21.6}$/MI$_{2.16}$) was calculated.
(2) Density
It was measured in accordance with ASTM D1505.
(3) Comonomer Distribution Slope (CDS)
It was measured using gel permeation chromatography-FTIR (GPC-FTIR).

TABLE 2

| | I$_{2.16}$ (g/10 min) | I$_{21.6}$ (g/10 min) | MFR | CDS | Density (g/cm$^3$) |
|---|---|---|---|---|---|
| Ex. 1 | 1.0 | 22.2 | 22.2 | 3.29 | 0.9180 |
| Ex. 2 | 0.95 | 21.9 | 23.0 | 3.35 | 0.9182 |
| Ex. 3 | 1.1 | 26.4 | 24.0 | 3.60 | 0.9179 |

The resins of Examples 1 to 3 and Comparative Examples 1 to 2 were each formed into a film having a thickness of 50 μm through a 40 mm blown film extruder (40 mm Φ screw, 75 mm Φ die, 2 mm die gap). Here, the extrusion conditions were: C1/C2/C3/A/D1/D2 of 160/165/170/175/180/180° C., a screw speed of 60 rpm, and a blow-up ratio (BUR) of 2.

The physical properties of the polyolefin films of Example 1 and Comparative Examples 1 and 2 were measured according to the following methods and standards. The results are shown in Table 3 below.
(5) Melting Temperature
The melting point of the polymer was measured using a differential scanning calorimeter (DSC; device name: DSC 2920, manufacturer: TA Instrument). Specifically, the polymer was heated to 200° C., the temperature was maintained for 5 minutes, it was cooled to 20° C., and the temperature was raised again. Here, the temperature elevation rate and cooling rate was 20° C./min, respectively.
(6) Haze
A film was molded to a thickness of 50 μm and measured according to ASTM D 1003. Here, each specimen was measured 5 times, and the average value was taken.

(7) Transparency

A film was molded to a thickness of 50 μm and measured according to ASTM D 1003. Here, each specimen was measured 5 times, and the average value was taken.

(8) Heat Seal Strength

It was measured in accordance with ASTM F88.

(9) Hot Tack Strength

It was measured in accordance with ASTM F1921.

TABLE 3

|  | Unit | Ex. 1 | C. Ex. 1 | C. Ex. 2 |
|---|---|---|---|---|
| $I_{2.16}$ | (g/10 min) | 1.0 | 1.08 | 1.0 |
| MFR | — | 22.2 | 16 | 33.2 |
| CDS | — | 3.29 | 0.07 | 0.01 |
| Density | (g/cm$^3$) | 0.9180 | 0.9182 | 0.9202 |
| Melting temp. | (° C.) | 119.3 | 117.2 | 108.3 |
| Haze | % | 5.45 | 8.72 | 4.66 |
| Transparency | % | 99.6 | 98.0 | 99.3 |
| Heat seal strength (0.2 bar, 1.5 seconds, 125° C.) | (gf/2.5 cm) | 93.06 | 2.16 | 5.22 |
| Heat seal strength (0.2 bar, 1.5 seconds, 140° C.) | (gf/2.5 cm) | 217.3 | 190.4 | 160.18 |
| Hot tack strength (95° C.) | (N/2 cm) | 0.657 | 0.307 | 0.280 |
| Hot tack strength (110° C.) | (N/2 cm) | 3.813 | 3.133 | 1.727 |

INDUSTRIAL APPLICABILITY

The polyolefin film, specifically, the linear low-density polyethylene film according to an embodiment of the present invention is readily formed and has excellent mechanical strength and excellent heat seal characteristics, in particular, excellent low-temperature heat seal characteristics.

The invention claimed is:

1. A polyolefin film, which is molded from a polyolefin having (1) a density of 0.910 to 0.940 g/cm$^3$; (2) a melt flow ratio (MFR) of 10 to 60 when measured at 190° C. as a ratio of the melt index (I21.6) under a load of 21.6 kg to the melt index (I2.16) under a load of 2.16 kg; and (3) a comonomer distribution slope (CDS) of 1 or more as defined by Equation 1, wherein the film has a heat seal strength of 90 gf/2.5 cm or more when measured at 0.2 bar, 1.5 seconds, and 125° C., and a heat seal strength of 210 gf/2.5 cm or more when measured at 0.2 bar, 1.5 seconds, and 140° C.:

$$CDS = \frac{\log C_{80} - \log C_{20}}{\log M_{80} - \log M_{20}} \quad \text{[Equation 1]}$$

in the equation, $C_{20}$ and $C_{80}$ are the comonomer contents at the point where the cumulative weight fraction in the comonomer distribution is 20% and 80%, respectively, and $M_{20}$ and $M_{80}$ are the molecular weights at which the cumulative weight fraction in the comonomer distribution is 20% and 80%, respectively, and wherein the polyolefin is a copolymer of an olefinic monomer and an olefinic comonomer.

2. The polyolefin film of claim 1, wherein the polyolefin has (1) a density of 0.910 to 0.920 g/cm$^3$; (2) an MFR of 20 to 40; and (3) a CDS of 2 to 5.

3. The polyolefin film of claim 1, wherein the polyolefin is prepared by polymerizing an olefinic monomer in the presence of a catalyst comprising at least one transition metal compound represented by Formula 1 and at least one cocatalyst compound:

[Formula 1]

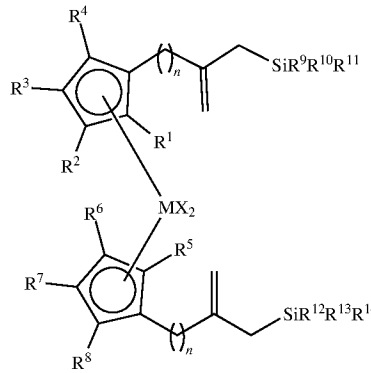

in Formula 1, n is each independently an integer of 1 to 20,

M is titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl $C_{1-20}$ alkyl, $C_{1-20}$ alkylamido, $C_{6-20}$ arylamido, or $C_{1-20}$ alkylidene, $R^1$ to $R^4$ and $R^5$ to $R^8$ are each independently hydrogen, substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, $R^9$ to $R^{11}$ and $R^{12}$ to $R^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, and $R^1$ to $R^4$ and $R^5$ to $R^8$ are each independently capable of being linked to adjacent groups to form a substituted or unsubstituted saturated or unsaturated $C_{4-20}$ ring.

4. The polyolefin film of claim 3, wherein the cocatalyst compound is at least one selected from the group consisting of a compound represented by Formula 2, a compound represented by Formula 3, and a compound represented by Formula 4:

[Formula 2]

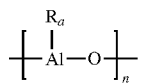

[Formula 3]

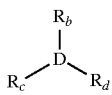

[Formula 4]

[L-H]⁺[Z(A)₄]⁻ or [L]⁺[Z(A)₄]⁻ in Formula 2, n is an integer of 2 or more, and Ra may each independently be a halogen atom, $C_{1-20}$ hydrocarbon, or $C_{1-20}$ hydrocarbon substituted with halogen, in Formula 3, D is aluminum (Al) or boron, and $R_b$, $R_c$, and $R_d$ are each independently a halogen atom, $C_{1-20}$ hydrocarbon, $C_{1-20}$ hydrocarbon substituted with halogen, or $C_{1-20}$ alkoxy, and in Formula 4, L is a neutral or cationic Lewis acid, [L-H]⁺ and [L]⁺ a Bronsted acid, Z is a group 13 element, and A is each independently substituted or unsubstituted $C_{6-20}$ aryl or substituted or unsubstituted $C_{1-20}$ alkyl.

5. The polyolefin film of claim 3, which further comprises a carrier for supporting the transition metal compound and the cocatalyst compound.

6. The polyolefin film of claim 1, wherein the olefinic monomer is ethylene, and the olefinic comonomer is at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

7. The polyolefin film of claim 6, wherein the polyolefin is a linear low-density polyethylene in which the olefinic monomer is ethylene, and the olefinic comonomer is 1-hexene.

8. The polyolefin film of claim 1, which has a hot tack strength at 95° C. of 0.5 N/2 cm or more and a hot tack strength at 110° C. of 3.5 N/2 cm or more.

9. The polyolefin film of claim 1, which has a haze of 10% or less when measured based on a thickness of 50 μm.

10. The polyolefin film of claim 1, which is at least one selected from the group consisting of a stretch film, an overlap film, a lamination, a silage wrap, and an agricultural film.

11. A process for preparing a polyolefin film, which comprises (a) polymerizing an olefinic monomer in the presence of a catalyst comprising at least one transition metal compound represented by Formula 1 and at least one cocatalyst compound to obtain a polyolefin; and (b) molding the polyolefin to obtain a film, wherein the polyolefin has (1) a density of 0.910 to 0.940 g/cm³; (2) a melt flow ratio (MFR) of 10 to 60 when measured at 190° C. as a ratio of the melt index (I21.6) under a load of 21.6 kg to the melt index (I2.16) under a load of 2.16 kg; and (3) a comonomer distribution slope (CDS) of 1 or more as defined by Equation 1, and the film has a heat seal strength of 90 gf/2.5 cm or more when measured at 0.2 bar, 1.5 seconds, and 125° C., and a heat seal strength of 210 gf/2.5 cm or more when measured at 0.2 bar, 1.5 seconds, and 140° C.:

[Formula 1]

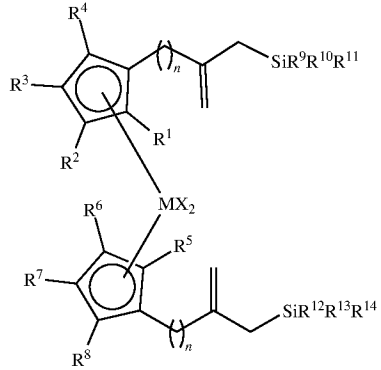

$$CDS = \frac{\log C_{80} - \log C_{20}}{\log M_{80} - \log M_{20}}$$ [Equation 1]

in Formula 1, n is each independently an integer of 1 to 20,

M is titanium (Ti), zirconium (Zr), or hafnium (Hf),

X is each independently halogen, $C_{1-20}$ alkyl, $C_{2-20}$ alkenyl, $C_{2-20}$ alkynyl, $C_{6-20}$ aryl, $C_{1-20}$ alkyl $C_{6-20}$ aryl, $C_{6-20}$ aryl, $C_{1-20}$ alkyl, $C_{1-20}$ alkylamido, $C_{6-20}$ arylamido, or $C_{1-20}$ alkylidene, $R^1$ to $R^4$ and R to Re are each independently hydrogen, substituted or unsubstituted $C_{1-20}$ alkyl, substituted or unsubstituted $C_{1-20}$ alkyl, $C_{6-20}$, substituted or unsubstituted $C_{6-20}$ aryl $C_{1-20}$ alkyl, substituted or unsubstituted $C_{1-20}$ heteroalkyl, substituted or unsubstituted $C_{3-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, $R^9$ to $R^{11}$ and $R^{12}$ to $R^{14}$ are each independently substituted or unsubstituted $C_{1-20}$ alkyl, substituted or unsubstituted $C_{2-20}$ alkenyl, substituted or unsubstituted $C_{6-20}$ aryl, substituted or unsubstituted $C_{1-20}$ alkyl $C_{6-20}$ aryl, substituted or unsubstituted $C_{6-20}$ aryl $C_{1-20}$ alkyl, substituted or unsubstituted $C_{1-20}$ heteroalkyl, substituted or unsubstituted $C_{6-20}$ heteroaryl, substituted or unsubstituted $C_{1-20}$ alkylamido, substituted or unsubstituted $C_{6-20}$ arylamido, substituted or unsubstituted $C_{1-20}$ alkylidene, or substituted or unsubstituted $C_{1-20}$ silyl, and $R^1$ to $R^4$ and $R^5$ to $R^6$ are each independently capable of being linked to adjacent groups to form a substituted or unsubstituted saturated or unsaturated $C_{4-20}$ ring, and in Equation 1, $C_{20}$ and $C_{80}$ are the comonomer contents at the point where the cumulative weight fraction in the comonomer distribution is 20% and 80%, respectively, and $M_{20}$ and $M_{80}$ are the molecular weights at which the cumulative weight fraction in the comonomer distribution is 20% and 80%, respectively.

12. The process for preparing a polyolefin film of claim 11, wherein, in step (a), the polymerization of an olefinic monomer is carried out by gas-phase polymerization.

13. The process for preparing a polyolefin film of claim 12, wherein, in step (a), the polymerization of an olefinic monomer is carried out in a gas-phase fluidized bed reactor.

14. The process for preparing a polyolefin film of claim 11, wherein the polyolefin is prepared by copolymerizing an olefinic monomer and an olefinic comonomer, in which the olefinic monomer is ethylene, and the alpha-olefinic comonomer is at least one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, and 1-hexadecene.

15. The process for preparing a polyolefin film of claim 14, wherein the olefinic monomer is ethylene, and the olefinic comonomer is 1-hexene.

16. The process for preparing a polyolefin film of claim 12, wherein the polyolefin film has a hot tack strength at 95° C. of 0.5 N/2 cm or more and a hot tack strength at 110° C. of 3.5 N/2 cm or more.

\* \* \* \* \*